United States Patent [19]
Manske

[11] 3,962,920
[45] June 15, 1976

[54] RESERVOIR PAD FOR TIME INDICATOR

[75] Inventor: Wendell J. Manske, Birchwood Village, Minn.

[73] Assignee: Minnesota Mining and Manufacturing Company, St. Paul, Minn.

[22] Filed: Feb. 24, 1975

[21] Appl. No.: 553,003

Related U.S. Application Data

[63] Continuation-in-part of Ser. No. 404,891, Oct. 10, 1973, Pat. No. 3,954,011, which is a continuation-in-part of Ser. No. 400,044, Sept. 24, 1973, abandoned.

[52] U.S. Cl. ............................ 73/356; 23/253 TP; 58/1 R; 116/114 AM; 426/87
[51] Int. Cl.² .................. G04F 13/00; G01K 11/12
[58] Field of Search .... 116/114 AM, 114 V, 114 Y, 116/114.5, 1; 73/356, 358; 426/87, 88; 23/253 TP; 58/1 R

[56] References Cited
UNITED STATES PATENTS

| | | | |
|---|---|---|---|
| 3,006,313 | 10/1961 | Huyck et al. | 116/114 V |
| 3,243,303 | 3/1966 | Johnson | 116/114 V |
| 3,414,415 | 12/1968 | Broad, Jr. | 116/114.5 |
| 3,785,930 | 1/1974 | Ellis | 23/253 TP |
| 3,802,842 | 4/1974 | Lange et al. | 116/114 AM |

*Primary Examiner*—Jerry W. Myracle
*Assistant Examiner*—Daniel M. Yasich
*Attorney, Agent, or Firm*—Alexander, Sell, Steldt & DeLaHunt

[57] ABSTRACT

Indicating device suitable for visibly measuring parameters such as time, temperature, and time-temperature relationships. The device comprises in combination a porous reservoir pad containing an indicating material, a wick material and activating means. The progress of the indicating material along the wick can be visibly observed to indicate the passage of time, exposure to a given minimum temperature, or a time-temperature relationship. The combination is adapted to conveniently regulate migration of the indicating material from the reservoir pad to the wick. A preferred method for making an indicating device is described.

10 Claims, 9 Drawing Figures

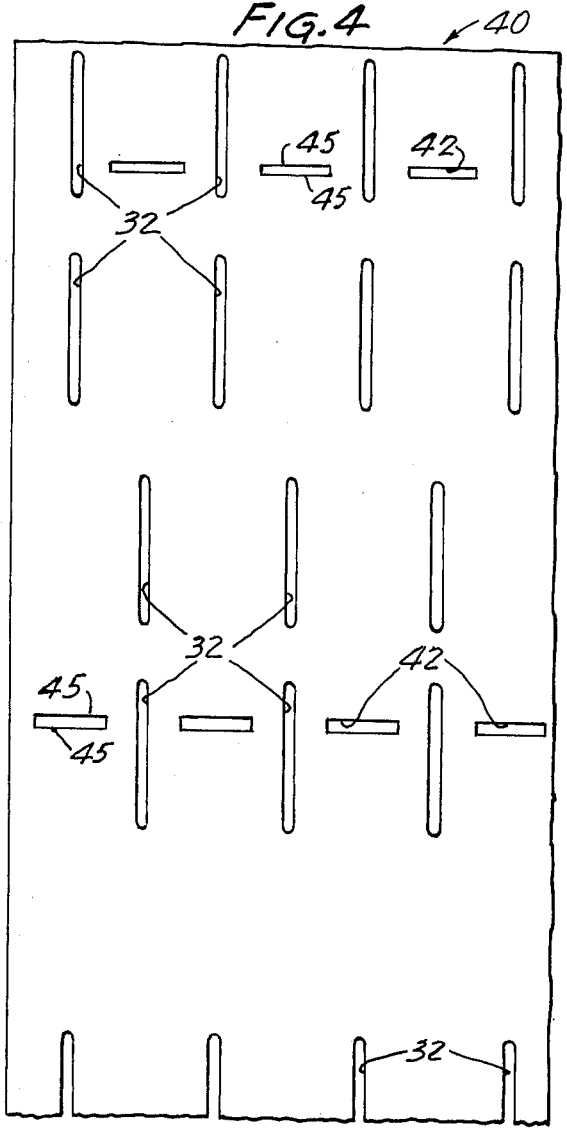
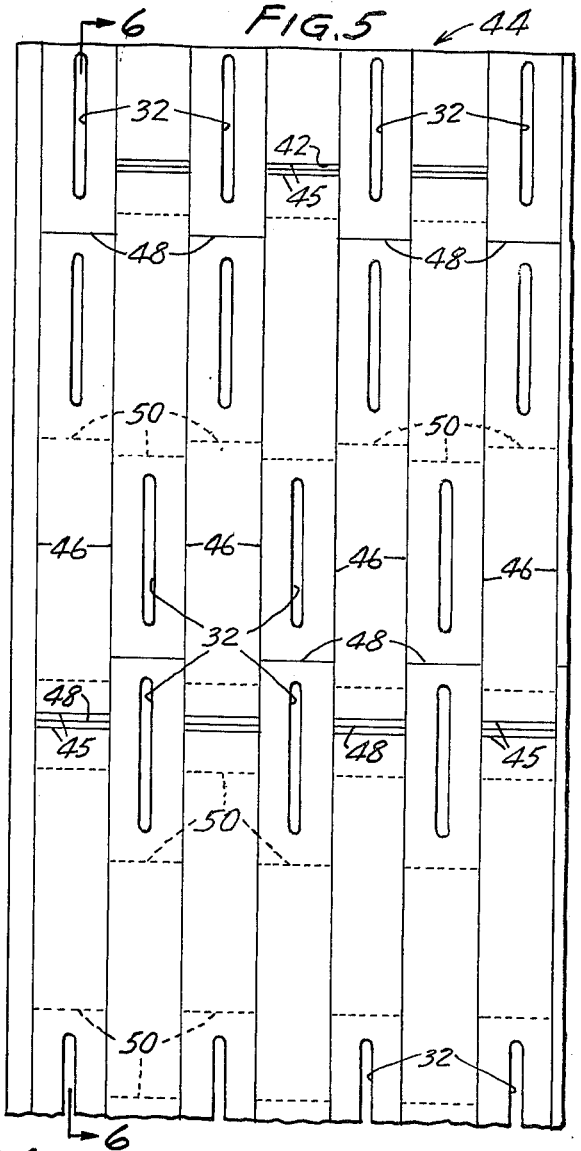
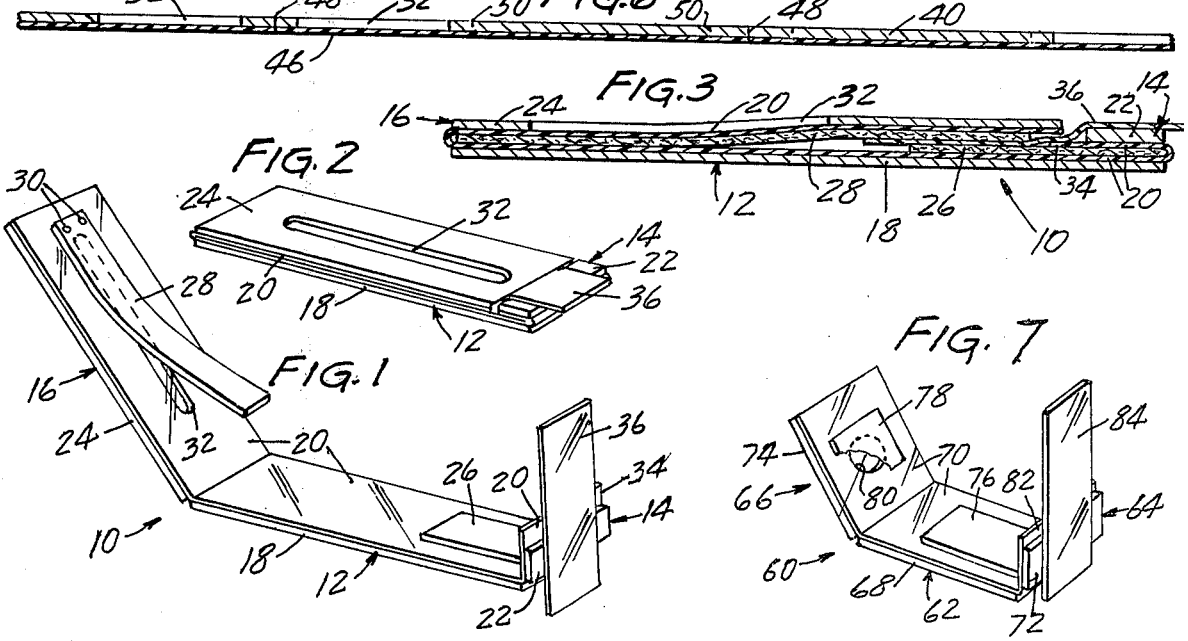
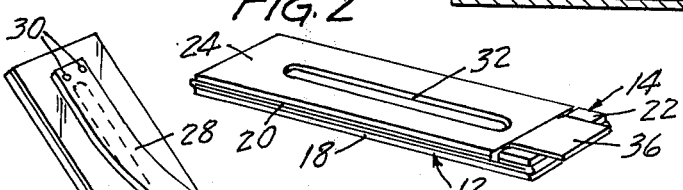
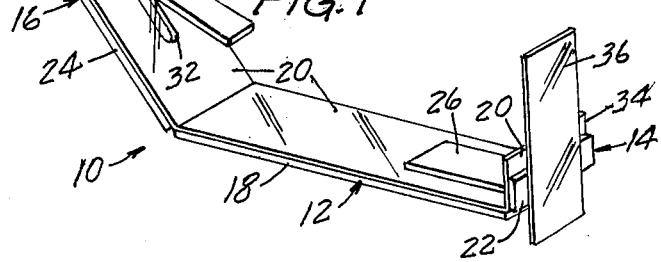
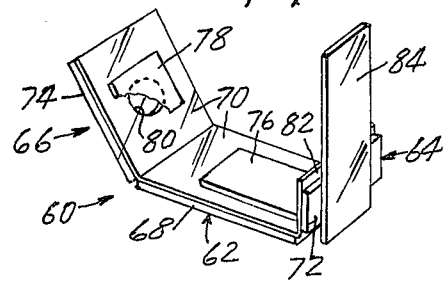

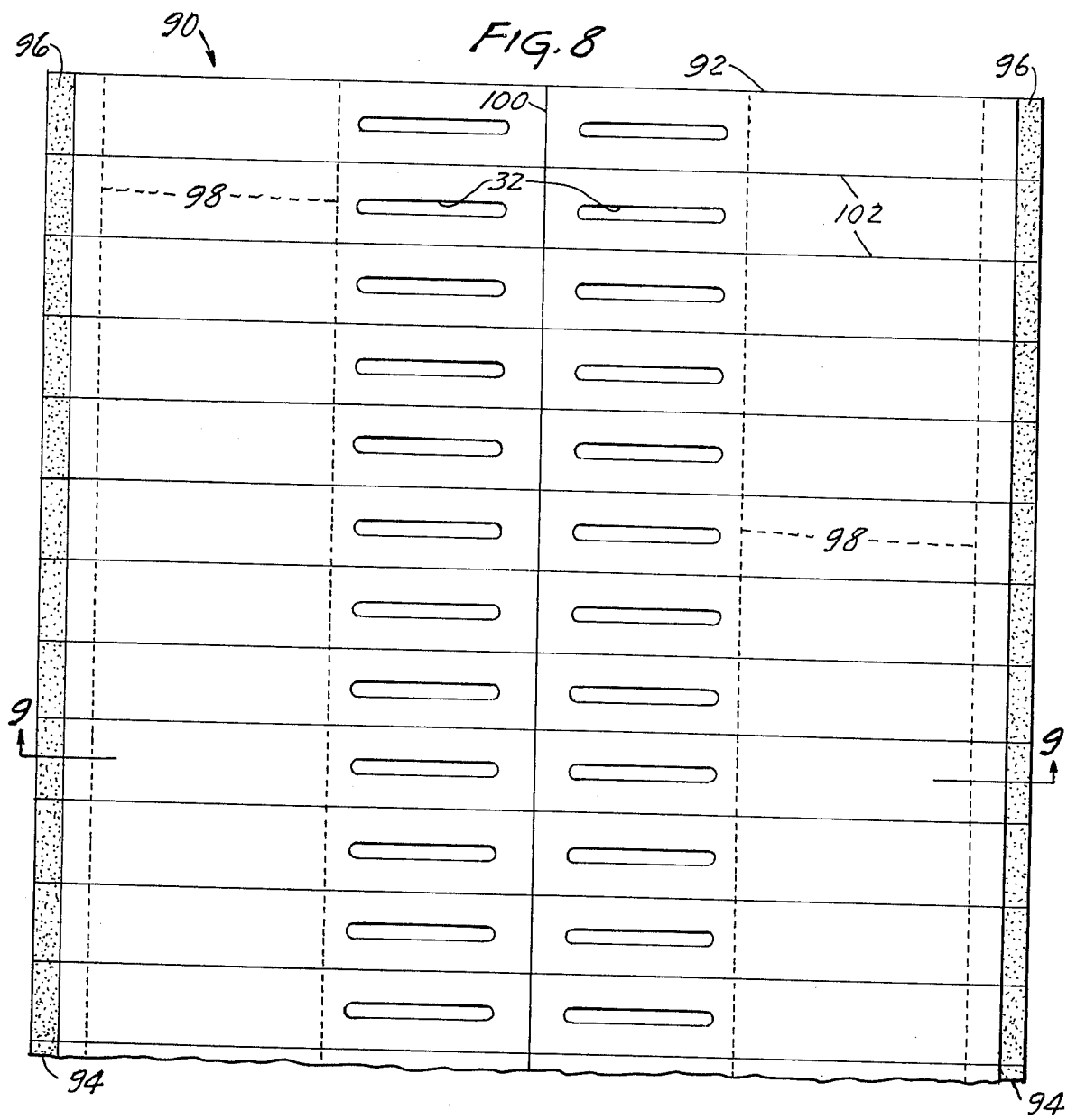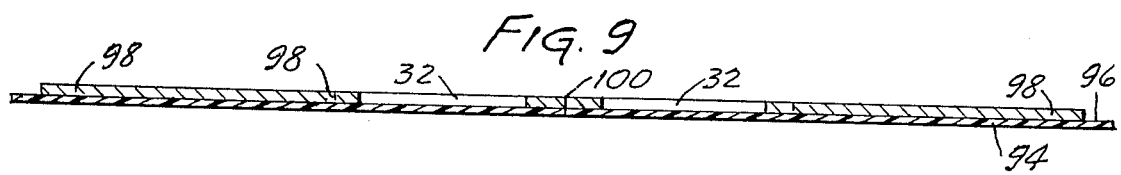

RESERVOIR PAD FOR TIME INDICATOR

This application is a continuation-in-part of copending U.S. application Ser. No. 404,891, filed Oct. 10, 1973, and now U.S. patent Ser. No. 3,954,011, which in turn is a continuation-in-part of U.S. patent application Ser. No. 400,044, filed Sept. 24, 1973, and now abandoned.

The present invention relates to an improved indicating device which is simple and compact and which can be economically mass produced. The device, when activated, causes an indicating material to migrate in a wick. The presence of the indicating material in the wick can be observed and related to the passage of a particular time interval, exposure to a given minimum temperature, or can indicate a particular time-temperature relationship. Means for controlling the measurable time interval or the time-temperature relationship which can be indicated are described.

A method of making an extremely compact, simple, and reliable indicating device is also described as a part of this invention.

The indicating devices of this invention are useful for attaching to perishable items to indicate the length of time they have been on the marketer's shelf. Perishable foods and other perishable articles of commerce, such as photographic materials which must be used within a limited time after manufacture, can have these indicators attached to the items and activated at the time of manufacture, processing or harvesting. A readily visible signal will appear when the materials have been in commerce for a designated period of time.

The devices may, by proper selection of the indicating material, be used to indicate exposure to a particular temperature and thus may be used with advantage in combination with temperature sensitive items, such as frozen foods, foods which require cooking at a particular minimum temperature, and the like.

Various devices used to indicate the passage of a predetermined interval of time are known in the prior art. Some of the chemical timing devices which are known have involved the exposure of a wick material to a free liquid source such as a pool of liquid, and have provided a chemical reagent in the wick at some predetermined point which reacted with the migrating liquid to change color. The liquid, wick material, and length of the wick are selected so as to provide a desirable time interval before the color change occurs.

U.S. Pat. No. 3,620,677, issued Nov. 16, 1971, to Morison teaches an indicator device suitable for detecting the passage of a predetermined time interval. This device comprises a fluid chamber with fluid therein, a wick material exposed to the fluid and an indicating means to detect the progress of the fluid along the wick. In addition, the indicating device is intimately sheathed by, and laminated to, an impervious covering to minimize the effects of the environment to which the device is exposed. The fluids which are used are aqueous liquids or water.

Similar constructions have been used as signal devices for determining if frozen food packages have been subjected to defrosting conditions prior to reaching the consumer. Devices of this type are shown by U.S. Pat. No. 2,560,537, issued July 17, 1951 to Andersen, and U.S. Pat. No. 2,951,764 issued Sept. 6, 1960 to Chase.

U.S. Pat. No. 3,243,303, issued Mar. 27, 1966 to Johnson, teaches the use of an absorbent pad completely saturated with an aqueous, immobilized fluid as a fluid source in a freeze-thaw indicator. U.S. Pat. No. 3,006,313 describes a visual telltale device which indicates if the contents of a container has been warmed to a given temperature. This device employs a reservoir pad substantially saturated with a colored material which is in the solid state below the selected critical temperature and becomes liquid above the critical temperature. An absorbent indicator pad is placed in register with the reservoir pad and separated therefrom by an impervious separator sheet. The device is preferably enclosed in an envelope of aluminum foil containing a window for viewing the indicator pad.

Indicating devices which use pools of free liquid as a fluid source have many disadvantages. The use of a pool of free liquid inherently creates problems related to devising means to securely contain the liquid pool and means to separate the liquid from the wick prior to "starting" the timer. In some cases, as in the frozen food indicators shown in the aforementioned patents to Andersen, Chase, and Johnson, freezing the liquid has been expedient. However, this poses problems in the manufacture of the device in that the device must be immediately frozen or the liquid introduced at some later time just prior to freezing. Moreover, this method is not convenient for devices which are intended for room temperature operation. The use of a free pool of liquid also provides a constant driving force which cannot be controlled to provide slower or faster liquid migration rates so that if a long time interval must be indicated, a very large wick is required. This introduces further complications in the design of chemical timing devices.

Prior art devices using reservoir pads saturated with an indicating liquid have not been useful to provide indication of a controllably wide range of time intervals, generally being used as temperature responsive indicators. These indicators have generally required immediate freezing of the liquid following assembly with storage at freezing temperatures, or have required the use of expensive and bulky components, e.g. aluminum foil envelopes, or uneconomical manufacturing techniques.

The present invention has overcome the aforementioned disadvantages by providing a simple, compact and reliable indicating device suitable for indicating time intervals, critical temperatures or time-temperature relationships. The device can be conveniently stored at ambient conditions and subsequently activated by a simple activating means. A convenient method of manufacturing the devices is also described as well as components which are particularly useful in the disclosed method.

The present invention can be more clearly understood by reference to the following illustrations wherein FIG. 1 is a perspective view of the elements of an indicator device prior to final assembly;

FIG. 2 is a perspective view of an assembled indicator device;

FIG. 3 is a cross section of the assembled device shown in FIG. 2.

FIG. 4 is a top view of a sheet useful in the manufacture of components for the device shown in FIGS. 1, 2 and 3.

FIG. 5 is a top view of a plastic surfaced sheet containing pre-cut components useful in making the indicators of the present invention;

FIG. 6 is a cross section along line 6—6 of the sheet of FIG. 5;

FIG. 7 is a perspective view showing an alternate embodiment of an indicator device prior to final assembly;

FIG. 8 shows a sheet having a plastic film adhered thereto useful in making components for an indicating device; and FIG. 9 is a cross section along line 9—9 of the sheet of FIG. 8.

Referring particularly to FIGS. 1–3, an indicator device 10 is shown comprising base 12, and cover means comprising first cover 14 and second cover 16. Base 12 comprises an elongated sheet 18 having adhered to and covering the surface a transparent impervious film 20 such as a polyethylene film or other plastic film. Similarly, covers 14 and 16 comprise sheets 22 and 24 having an adhered covering of transparent impervious film 20. Sheets 18, 22 and 24 can be any semi-rigid material which can be cut, folded and flexed to provide the device described herein. Paperboard is generally preferred for reasons of economy. The plastic film 20 can be adhered to the sheets 18, 22 and 26 by any suitable means such as adhesive bonding, heat sealing, spot welding, or the like. As can be appreciated, the impervious film need not be transparent except for that portion overlying the viewing window 32.

A porous reservoir pad 26 is located on base 12, preferably proximate cover 14 as shown in FIGS. 1 and 3. The reservoir pad 26 may be paper or other porous absorbent material. Preferably the reservoir pad 26 is a piece of blotting paper. The reservoir pad 26 may be adhered to base 12 if desired, although in the embodiment shown in FIGS. 1–3 this is not necessary since pad 26 is securely held in the assembled indicator by its relation to cover 14. Reservoir pad 26 contains an indicator material therein (not shown) which may be an absorbed liquid or which may be a solid which becomes liquid at the operating temperatures of indicator 10. The various indicating materials useful in the indicating devices of this invention will be described in greater detail hereinafter.

Wick 28 is shown adhered to second cover 16 by spot welds 30 and is positioned overlying viewing window 32 in cover 16. The wick shown in FIGS. 1–3 is an elongated piece of blotter paper which will absorb liquid and allow migration of the liquid throughout the wick. Other wick materials can be used with advantage such as films deposited from starch slurries and silica sols, compacted powders such as diatomaceous earth and talc and other materials having a sufficiently fine porosity to form capillaries through which the liquids in the reservoir pad 26 will flow when wick 28 and pad 26 are in intimate contact.

Protective tab 34 is shown extending from cover 14. Tab 34 is an impervious material which, in assembled indicator 10, overlies a portion of pad 26 to protect the abutting edges of covers 14 and 16 from the liquid in pad 26. Alternatively, tab 34 could be a separate barrier strip overlying a portion of pad 25 and underlying the abutting edge portions of covers 14 and 16. Yet another alternative is to seal the portion of pad 26 underlying the abutting edges of covers 14 and 16 so that the liquid in pad 26 will not be available in the sealed area of the pad.

Activator strip 36 is an impervious film such as a plastic strip which, when in place, prevents contact between pad 26 and wick 28. Activator trip 36 may be removably adhered to cover 14 to prevent accidental removal of strip 36.

To seal device 20 and to bias wick 28 toward pad 26, the open sides of the indicator 10 between base 12 and covers 14 and 16 are brought into contact and sealed or bonded such as by heat sealing, by using an adhesive or by the use of mechanical fasteners such as staples or the like. Thus, when the covers are sealed the only opening in indicator 10 is the slot between abutting covers 14 and 16 through which activator strip 36 extends.

FIGS. 4, 5 and 6 show sheets used in one method of manufacture of indicators of the type shown in FIGS. 1–3.

In FIG. 1 a portion of a paperboard sheet 40 is shown containing a patterned plurality of viewing windows 32 and rectangular openings 44 having long edges 45. The window 32 is located so as to eventually become the window 32 of the indicator shown in FIGS. 1–3. The long edges 45 of rectangular opening 42 are located to form the ends of a pair of opposed cover sheets 22 of indicator 10 shown in FIGS. 1–3.

FIGS. 5 and 6 show the sheet 40 of FIG. 4 after being further processed. Sheet 44 of FIG. 5 comprises paperboard sheet 40 having an impervious plastic film 46 laminated to and completely covering the upper major surface thereof. Sheet 44 is cut into rectangular pieces by cutting along solid vertical lines 46 and horizontal solid lines 48. The resulting elongated rectangular pieces are divided into portions corresponding to base 12, and cover portions 14 and 16 of FIGS. 1–3 by scoring the paperboard sheet along the horizontal dashed lines 50. Score lines 50 can be cuts completely through the paperboard sheet 40 (but not through plastic film 48), can be perforations, or can be bar score lines made by compressing sheet 44 along lines 50 without cutting either paperboard sheet 40 or the plastic film 48. The score lines allow the rectangular pieces to be readily folded to form the indicator shown in FIGS. 1–3.

FIG. 7 shows another embodiment of the present invention which is particularly useful as a critical temperature indicator. In this embodiment, indicator 60 comprises a base 62 and cover means comprising a first cover 64 and a second cover 66. Base 62 comprises a sheet 68 having adhered to the surface an impervious film 70. Similarly, covers 64 and 66 comprise sheets 72 and 74 having an adhered covering of impervious film 70.

A porous reservoir pad 76 is located on base 62 proximate first cover 64. Pad 76 contains an indicating material therein, preferably a solid material which becomes liquid at the desired critical temperature.

Wick 78 is shown as a small pad located on, and adhered to, second cover 66 so that a portion of wick 78 is visible through window 80. Protective tab 82 is shown extending from cover 64. When covers 64 and 66 are consecutively folded over base 62, tab 82 overlies a portion of reservoir pad 76 and protects the abutting edges of covers 64 and 66 from the liquid in reservoir pad 76. Alternatively, tab 82 can be replaced by a separate strip of impervious material partially covering pad 76 and protecting the abutting edges of covers 64 and 66 from the liquid in pad 76. Yet another means of protecting the abutting edges of covers 64 and 66 is by the application of an impervious film-forming liquid to a portion of pad 76 underlying the abutting edges of covers 64 and 66.

Activating strip 84 is an impervious strip, such as a plastic strip, which, when in place in the assembled indicator, prevents contact between pad 76 and wick 78. Activator strip 76 may be removably adhered to cover 64 to prevent accidental removal of the activator strip.

Cover 64 is folded over base 62 and the activator strip 84 set in place overlying pad 76 and extending over cover 64. Cover 66 is subsequently folded over base 62 abutting cover 64. The sides of the covers 64 and 66 and base 62 are then bonded together to seal the indicator 60 and bias wick 78 toward reservoir pad 76.

FIGS. 8 and 9 show an alternate embodiment of a sheet from which components for making an indicator 10, as shown in FIGS. 1–3, can be obtained. Sheet 90 comprises paperboard sheet 92 containing windows 32. An impervious film 94 overlies and is adhered to sheet 92 and extends beyond the edges of sheet 92 to form flap 96 along each edge of sheet 90. Sheet 90 is scored along lines 98 such as by cutting through paper sheet 92 or bar scoring sheet 90 along lines 98. Sheet 90 is then cut through along vertical line 100 and horizontal lines 102. This provides rectangular pieces having a window therein and a tab on one end which pieces are suitable for use as base 12 and covers 14 and 16 of the indicator 10 shown in FIGS. 1–3. An alternative to cutting the sheet 90 completely through at lines 100 and 102 is to discontinuously cut or perforate the sheet so that the pieces do not separate, but are held together by "hand tabs" until the pieces are finally torn from the sheet by hand.

The indicators shown in FIGS. 1–3 and 7 are activated by removing the activating strip 36, 84, thereby allowing intimate contact between the wick and reservoir pad. The indicating material can then migrate from the reservoir pad to and through the wick. The presence of indicating material in the wick can be observed through the viewing window.

In the embodiments shown in FIGS. 1–3 the wick is long in proportion to the pad and a relatively long time can elapse before the indicating material progresses the full distance along the wick. These indicators are useful to measure various periods of elapsed time. The embodiment shown in FIG. 7 has a wick which is slightly smaller or substantially the same size as the reservoir pad and completely overlies the pad. The pad length for the indicating material to travel from the reservoir pad to the viewing window is essentially the thickness of the wick, a relatively short distance. This embodiment is useful for indicating very short elapsed times or for indicating exposure to a critical temperature since the response time can be very rapid.

In one application, article 60 of FIG. 7 can be used to indicate exposure of an article of commerce to a critical temperature, e.g. a thawing temperature. A colored liquid which is solid at the temperature at which the frozen article is kept, but which changes from a solid to a liquid at the critical temperature, is absorbed in reservoir pad 76. The indicator 60 is then finally assembled. The indicator can then be stored prior to use. When the indicator is to be used it can be applied to the article to be frozen and, after freezing, the activator strip 84 is removed. The indicating material in pad 76 remains solid until the indicator is exposed to a temperature above the critical temperature whereupon the solid indicating material melts and migrates through wick 78 and becomes visible through window 80. The color remains even though the indicator is again cooled to below the critical temperature.

The indicating materials can be any materials which are liquid or become liquid at the temperatures at which the indicator is to be operative. Thus, liquids containing colored dyes or color forming reactants can be used. Alternatively, solids which become liquid at the operating temperatures are also useful as indicating materials in the indicators of the present invention and are particularly useful where the indicators are used to indicate exposure to a given minimum temperature.

A suitable liquid indicating means comprises tributyl phosphate and/or trioctyl phosphate containing a dye such as "Oil Blue A" available commercially from DuPont. These liquids are relatively non-volatile and are particularly useful as room temperature elapsed time indicators. If desired, the wick can have indicia printed thereon to aid in visibly indicating the progress of the colored liquid along the wick. Other materials having various melting points can also be used to provide a temperature sensitive indicator. Typical materials which have been used are methyl stearate, m.p. 94° F.; methyl palmitate, m.p. 81° F., ethyl stearate, m.p. 69° F., methyl myristate, m.p. 58° F., butyl stearate, m.p. 54° F., and dimethyl phthalate, m.p. 30° F.

Alternatively, a color producing chemical coreactant system may be employed as the indicating means in the present invention. This can be accomplished, for example, by dissolving one of the coreactant pair in the material contained in the reservoir pad and additionally coating or impregnating the wick material at a predetermined distance from the reservoir pad with the second color producing coreactant chemical. When the indicating material has migrated the predetermined distance along the wick, the chemicals react to produce a visible color, indicating the passage of a given time interval. Chemical coreactant systems which form colored chemical complexes are well known. A useful system comprises dithiooxamide or N,N'-diorgano substituted derivatives of dithiooxamides as one of the chemical coreactants and a metal salt such as nickel rosinate as the other coreactant. These materials react to provide a characteristic purple colored complex. A preferred coreactant system comprises N,N'-bis-(2-octanoyloxyethyl) dithiooxamide as the first coreactant and nickel rosinate as the second coreactant chemical.

As disclosed in copending application Ser. No. 404,891, the concentration of the indicating fluid in the reservoir pad can be varied to control the time period which a given indicating material requires to traverse a given length of wick. Thus, wicks having a given physical dimension can be used to indicate a variety of time periods depending on the particular indicating material used and the initial concentration of the indicating material in the reservoir pad.

The indicators described in the present invention are substantially sealed to prevent influence of the migration characteristics by the environment to which the indicator is exposed, and are constructed to resist loss of indicating material from the reservoir pad thereby maintaining the initial concentration of the indicating material in the reservoir pad up to the time of activation.

The indicators shown in the drawings can be conveniently and economically prepared from a stiff paper-like material. In one method a large paperboard sheet is provided and indicator components are prepared by selecting a rectangular area on the sheet and selecting a first rectangular end portion, a second separate rectangular end portion, and a remaining rectangular central portion within the rectangular area. These portions will ultimately form cover sheets 22 and 24 and base sheet 18, respectively, of indicator 10 as shown in FIGS. 1–3. The combined area of the first and second end portions is equal to the area of the remaining central portion. As shown in FIGS. 4–6, rectangular opening 42 is cut in the paperboard sheet having one of the long edges 45 coextensive with the distal end of the selected first end portion. A second opening 32 is cut within the area of the selected second end portion. This opening will ultimately be the viewing window in cover 16 of indicator 10. An impervious flexible material, such as a plastic film, is then adhered to one major surface of the sheet such as by heat sealing, adhesive bonding or the like, thereby sealing one major surface of the sheet and covering the openings previously cut in the sheet. As shown in FIG. 5, the sheet is scored along the lines 50 dividing the first and second end portions within the rectangular area by cutting, perforating, bar scoring or the like. This allows the ends to be easily folded over the central portion of the rectangular area during final assembly of the indicator.

A rectangular piece is then cut from the sheet by cutting along lines 46 and 48. This piece includes the selected rectangular area of the paperboard sheet and an integral rectangular tab of impervious film connected to, and coextensive with, the end of the selected first end portion. The tab is preferably equal to one half the area of the rectangular opening 42 in sheet 40.

The above steps can be repeated to provide from a single paperboard sheet a plurality of rectangular pieces having integral tabs which pieces may be of the same or different size.

Each of the rectangular pieces are then used to prepare indicators by locating a reservoir comprising a porous material such as a pad of blotter paper, rubber sponge, flocked porous coating or the like, on the sealed surface of the paperboard within the central portion of the rectangular piece and proximate the selected first end portion. The pad is located so that at least a portion of the pad will extend out from under the first end portion when the end portion is folded over the central portion to form part of the cover of the indicator. The reservoir pad extends from under the first end portion so that the wick can contact the pad when the indicator is finally assembled. An indicating material is absorbed in the reservoir pad such as by applying a drop of liquid to the pad and allowing the liquid to be absorbed. Alternatively, a solid material can be applied to the pad, melted, allowed to absorb into the pad, and resolidified.

A wick material is located on and adhered to the sealed surface of the selected second end portion such that the wick is at least partially visible through the viewing window located in the end portion and will overlie a portion of the reservoir pad when the second end portion is folded over the central portion of the rectangle to form part of the cover of the indicator. The wick can be a piece of blotter paper which is heat sealed, adhesively bonded, or mechanically fastened to the second end portion. Alternatively, the wick can be a film of porous material deposited directly on the surface of the end portion as previously mentioned.

The first end portion is then folded over the central portion so that their sealed surfaces are facing. This end portion then forms a part of the cover of the indicator.

After folding the first end portion over the central portion, an impervious activator strip is located overlying the folded end portion and extending beyond the end portion to cover the exposed portion of the reservoir pad. This activator strip can be removably adhered to the underlying end portion if desired to prevent accidental removal of the activator strip.

The second cover portion is then folded onto the central portion abutting the first end portion to form, together with the first end portion, the cover of the indicator. The underlying central portion forms the base of the indicator. The side edges of the cover portions and the side edges of the base are then bonded together by heat sealing, adhesive bonding, or mechanical fastening to seal the wick and reservoir pad within the indicator and bias the wick toward the reservoir pad so that when the activator strip separating the wick and pad is removed, intimate contact will be established between the wick and the reservoir pad.

An alternate means of providing rectangular pieces with an integral plastic tab useful in the manufacture of the indicators of this invention can be illustrated with reference to FIGS. 8 and 9 of the drawings. A paperboard sheet such as sheet 92 is provided and a rectangular area is selected on the sheet having one edge common with the edge of the sheet. A first rectangular end portion, a second separate rectangular end portion and a remaining rectangular central portion are then selected within the rectangular area, the selected first end portion being adjacent and having the distal edge common with the aforementioned common edge of the sheet.

An opening, such as opening 32 of FIG. 8, is cut in the sheet within the area of the selected second end portion. A sheet of impervious flexible material, such as a plastic film, is adhered to a major surface of the sheet, substantially covering the sheet and extending a short distance beyond the aforementioned common edge of the sheet to form a tab, such as tab 96 of sheet 90 in FIGS. 8 and 9.

The paperboard sheet is scored along the lines defining the selected end portions and the selected rectangular area, including the integral tab, is cut from the composite sheet. A plurality of such pieces can be prepared from a single sheet by repeating the above steps. The components are then used to provide an indicator by incorporating reservoir pad, indicator material, wick and activator strip as in the previously described method.

An attaching means can be applied to the base of the indicators of the present invention. The attaching means can be used to conveniently adhere an indicator to an article of commerce. A preferred attaching means is a pressure-sensitive adhesive layer having a removable protective liner thereon.

I claim:

1. An indicating device comprising, in combination,
a base sheet having first and second ends;
a liquid impervious film adhered to a first major surface of said base sheet;
a porous reservoir pad contacting said film and located proximate said first end of said base sheet, said pad containing an indicating material and including means for containing and presenting a controlled amount of liquid to a wick in contact therewith, and including means for selectively limiting the maximum migration rate for a given liquid below the migration rate provided by a free pool of the liquid;

a cover overlying and substantialy coextensive with said base sheet, said cover comprising first and second abutting cover sheet portions with said first cover sheet portion extending from said first end of said base sheet and having its edge abutting said second cover sheet portion transverse of said reservoir pad, and said second cover sheet portion extending to said second end of said base sheet and having a viewing window therein;

a liquid impervious film adhered to the inner surfaces of said cover sheets and connecting said cover sheets to the film-covered base sheet;

a protective strip comprising liquid impervious film underlying the abutting edges of said first and second cover sheet portions and interposed between said reservoir pad and the abutting edges on said first and second cover sheet portions to protect the adjacent edges of said first and second cover sheet portions from the indicating material in the reservoir pad;

a wick adhered to said second cover sheet portion and contained between said second cover sheet portion and said base sheet, at least a portion of said wick being visible through the window in said second cover sheet portion and at least a portion of said wick lapping at least a portion of said reservoir pad;

the sides of the cover sheet and base sheet being sealed together to bias said wick toward said pad; and a liquid impervious activating strip having one end portion positioned between and covering the adjacent surface portions of said wick and said reservoir pad, and having its opposite end portion extending from said cover sheet to afford manual engagement to pull said activating strip from between said pad and wick and allow migration of said indicating material into said wick.

2. An indicating device according to claim 1 wherein said protective strip is integral with and extends from the abutted edge of said first cover sheet.

3. An indicating device according to claim 1 wherein the reservoir pad and the wick are blotter paper.

4. An indicating device according to claim 1 wherein the wick is a porous film deposited directly on the sealed surface of said second cover sheet portion.

5. An indicating device according to claim 1 wherein said indicating material is a colored liquid.

6. An indicating device according to claim 1 wherein said viewing window is in overlying register with at least a portion of said reservoir pad and said wick is interposed between said pad and said window.

7. An indicating device according to claim 6 wherein said indicating material is a solid having a melting point corresponding to a selected critical temperature.

8. An indicating device according to claim 1 wherein said wick is an elongated wick only partially juxtaposed with said reservoir pad whereby there can be provided a visible, migrating front of indicating material along a major dimension of said wick.

9. An indicating device comprising:

an enclosure having generally planar opposed walls defining a chamber therebetween, having a window in one of said walls and having a slot through one of said walls spaced from said window;

a porous reservoir pad located within said chamber adjacent said slot, said pad containing an indicating material and including means for containing and presenting a controlled amount of liquid to a wick in contact therewith and including means for selectively limiting the maximum mitration rate for a given liquid below the migration rate provided by a free pool of the liquid;

a wick fixed within said chamber, at least a portion of said wick being visible through said window and at least a portion of said wick overlapping at least a portion of said reservoir pad;

the sides of the cover sheet and base sheet being sealed together to bias said wick toward said pad;

an impervious activating strip having one end portion removably positioned between and covering the adjacent surface portions of said wick and said reservoir pad, and having its opposite end portion extending through and projecting from said slot to afford manual engagement to pull said activating strip from said enclosure and allow migration of said liquid into said wick, and wherein the walls of said enclosure are composite walls each comprising an outer structural member and an adhered inner film which is impervious to said indicating material and which connects said opposed walls together at their corresponding ends, and the inner film on said wall defining said slot includes a protective tab extending from the side of said slot opposite said wick between said reservoir pad and the impervious film on the wall on the opposite side of said slot to protect the edges of said structural member defining the slot from the indicating material in the reservoir pad.

10. An indicating device according to claim 8 wherein said wick is an elongated wick only partially juxtaposed with said reservoir pad whereby there can be provided a visible, migrating front of indicating material along a major dimension of said wick.

* * * * *

UNITED STATES PATENT AND TRADEMARK OFFICE
CERTIFICATE OF CORRECTION

PATENT NO. : 3,962,920
DATED : June 15, 1976
INVENTOR(S) : Wendell J. Manske

It is certified that error appears in the above-identified patent and that said Letters Patent are hereby corrected as shown below:

Column 5, line 31, change "'hand tabs'" to -- "hang tabs" -- ;

line 47, change "pad" (third occurrence) to -- path -- .

Column 10, line 50, change "claim 8" to -- claim 9 -- .

Signed and Sealed this

Twelfth Day of October 1976

[SEAL]

Attest:

RUTH C. MASON
Attesting Officer

C. MARSHALL DANN
Commissioner of Patents and Trademarks